United States Patent
Lee et al.

(10) Patent No.: US 9,973,521 B2
(45) Date of Patent: May 15, 2018

(54) SYSTEM AND METHOD FOR FIELD EXTRACTION OF DATA CONTAINED WITHIN A LOG STREAM

(71) Applicant: International Business Machines Corporation, Armonk, NY (US)

(72) Inventors: Tien Hiong Lee, Singapore (SG); Konstantin Levinski, Singapore (SG); Xin Qian, Singapore (SG); Harjoben Singh, Singapore (SG); Weng Sing Tang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 14/980,086

(22) Filed: Dec. 28, 2015

(65) Prior Publication Data
US 2017/0187734 A1 Jun. 29, 2017

(51) Int. Cl.
*H04L 29/06* (2006.01)
*G06N 99/00* (2010.01)
*G06F 11/14* (2006.01)

(52) U.S. Cl.
CPC ...... *H04L 63/1425* (2013.01); *G06F 11/1446* (2013.01); *G06N 99/005* (2013.01); *H04L 63/1416* (2013.01); *G06F 2201/805* (2013.01)

(58) Field of Classification Search
CPC .......... G06F 2201/805; G06F 11/1446; G06N 99/005; H04L 63/1416; H04L 63/1425
See application file for complete search history.

(56) References Cited

U.S. PATENT DOCUMENTS 6,167,369 A  12/2000  Schulze
6,944,577 B1 *  9/2005  Mauer ............... H04L 7/007
                                                    702/187
(Continued)

FOREIGN PATENT DOCUMENTS

CN     106919555 A   7/2017
EP       1501047 A2  1/2005
(Continued)

OTHER PUBLICATIONS

Mala et al., "Data Stream Mining Algorithms—A Review of Issues and Existing Approaches," International Journal on Computer Science and Engineering (IJCSE), vol. 3, No. 7, Jul. 2011, pp. 1-7.
(Continued)

*Primary Examiner* — Yonas Bayou
(74) *Attorney, Agent, or Firm* — Samuel A. Waldbaum

(57) ABSTRACT

Embodiments of the present invention disclose populating a database by conducting a training phase to analyze training security log streams. A server extracts the words contained within the training security log and replaces each of the extracted words with a symbol to form a symbol string and an n-gram scan is conducted on the symbol string to generate statistical data. Tokens are extracted from symbol string, where the tokens are words, phrase or alphanumeric sequence represented by a symbol within training security log stream. The symbol string is replaced with the words they represent to allow for the identification of the actual token phrases. A scan is conducted on the token phrase to acquire scan data on the identified token phrases. Once the tokens, position information, and scan data are known they are stored within the database to allow security log streams to be analyzed in real time.

18 Claims, 6 Drawing Sheets

(56) References Cited

U.S. PATENT DOCUMENTS

| | | |
|---|---|---|
| 7,013,301 B2 | 3/2006 | Holm et al. |
| 7,644,076 B1 | 1/2010 | Ramesh et al. |
| 7,653,633 B2 | 1/2010 | Villella et al. |
| 7,912,907 B1 | 3/2011 | Mantel et al. |
| 7,917,353 B2 | 3/2011 | Dayan et al. |
| 7,925,498 B1 | 4/2011 | Baker et al. |
| 7,937,467 B2 | 5/2011 | Barber |
| 8,131,840 B1* | 3/2012 | Denker ............... H04L 67/2819 370/252 |
| 8,141,153 B1* | 3/2012 | Gardner ................. G06F 21/44 726/22 |
| 8,150,096 B2 | 4/2012 | Alattar |
| 8,363,770 B1* | 1/2013 | Xue ...................... H04L 7/0338 375/316 |
| 8,589,436 B2 | 11/2013 | Srinivasan et al. |
| 8,655,647 B2 | 2/2014 | Moore |
| 8,768,895 B2 | 7/2014 | Patterson et al. |
| 9,075,718 B2 | 7/2015 | Hinterbichler et al. |
| 2003/0076782 A1* | 4/2003 | Fortin ................. H04L 43/0852 370/230.1 |
| 2004/0120352 A1* | 6/2004 | Jungerman ............... H04L 1/24 370/503 |
| 2009/0199092 A1* | 8/2009 | Ghassabian ............. G06F 3/014 715/261 |
| 2011/0099154 A1 | 4/2011 | Maydew et al. |
| 2011/0202876 A1* | 8/2011 | Badger ................. G06F 3/0237 715/816 |
| 2012/0029910 A1* | 2/2012 | Medlock ............... G06F 3/0237 704/9 |
| 2012/0259615 A1* | 10/2012 | Morin .................... G06F 3/0237 704/9 |
| 2013/0054496 A1* | 2/2013 | Marianetti, II ...... G06N 99/005 706/12 |
| 2013/0054552 A1* | 2/2013 | Hawkins ............... G06N 99/005 707/706 |
| 2013/0132008 A1 | 5/2013 | Borean et al. |
| 2014/0063237 A1 | 3/2014 | Stone et al. |
| 2014/0219101 A1* | 8/2014 | Horovitz ............. H04L 47/2483 370/236 |
| 2014/0323057 A1 | 10/2014 | Carbajal |
| 2016/0283853 A1 | 9/2016 | Lee et al. |

FOREIGN PATENT DOCUMENTS

| | | | |
|---|---|---|---|
| WO | 2010030794 A1 | 3/2010 | |
| WO | 2014117406 A1 | 8/2014 | |
| WO | WO 2016059418 A1 * | 4/2016 | ........... G06F 17/276 |

OTHER PUBLICATIONS

Logentries, "Real-time Log Parsing Using Regex," Product, https://logentries.com/product/regular-expression-field-extraction/, Printed on Aug. 25, 2015, pp. 1-5.

Mell et al., "The NIST Definition of Cloud Computing," National Institute of Standards and Technology, U.S. Department of Commerce, Special Publication 800-145, Sep. 2011, pp. 1-7.

* cited by examiner

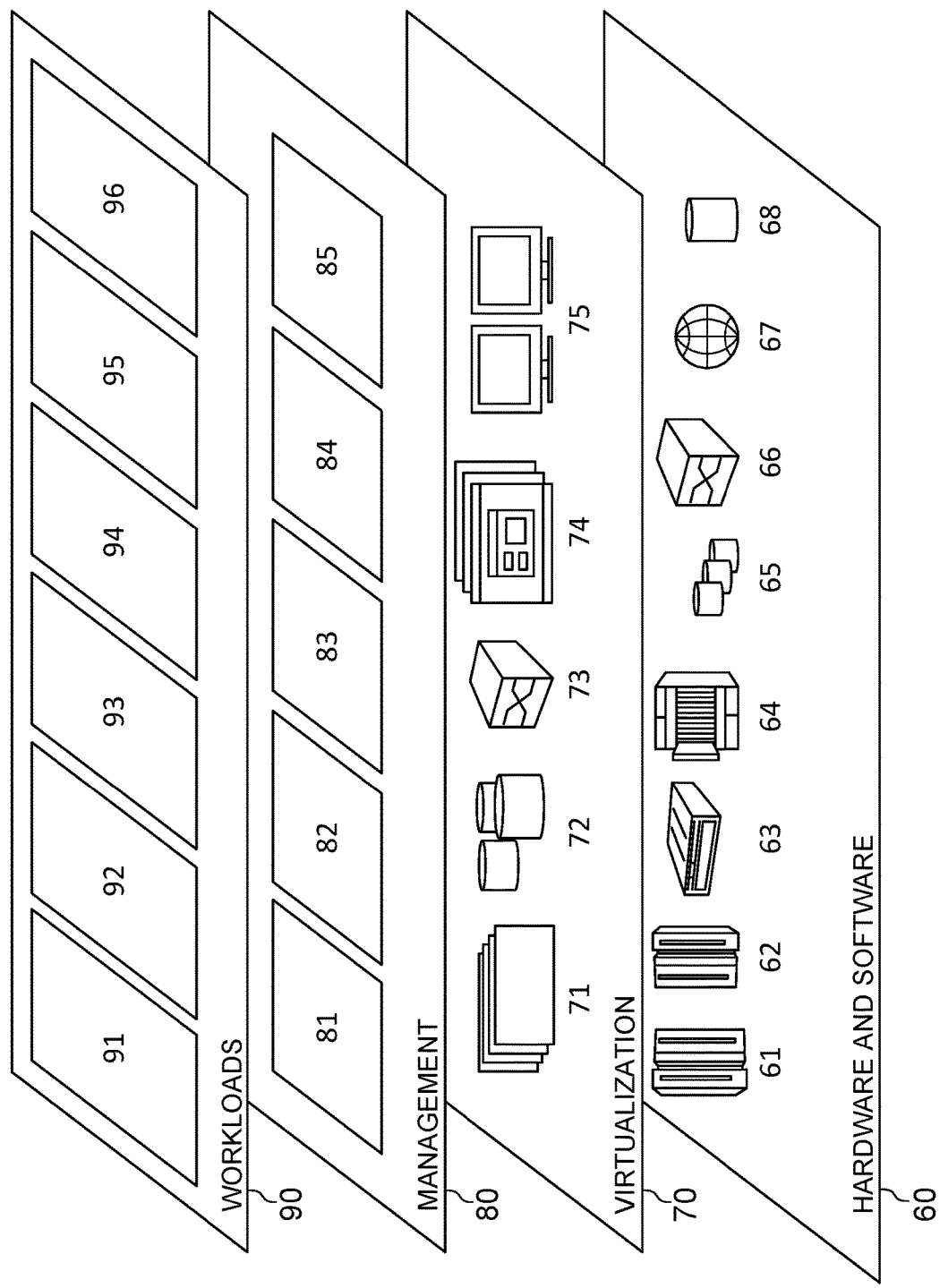

SYSTEM AND METHOD FOR FIELD EXTRACTION OF DATA CONTAINED WITHIN A LOG STREAM

BACKGROUND

The present invention relates generally to the field of data stream analysis, and more particularly to extracting relevant data from an incoming log stream.

Security log streams come in all shapes and sizes. The structure of the security log streams and the information contained within each stream varies vastly from device to device. Due to the nature of the log streams, a method to parse out desired fields may make use of regular expressions (regexes). Although using regexes is more efficient than other string comparison methods, it still has downsides and may not be quick enough to perform the kind of real time analysis of the security log streams.

In regular expression based parsing methods, the user manually crafts regular expressions to match different pieces of useful information in various kinds of security log streams. When a log format changes or new log types are added, the user will have to modify or update the existing regular expressions, or add new code containing new regular expressions to support the changes and additions. Moreover, the efficiency of parsing may be dependent on the technical skills of the user crafting the regular expressions. Correlating and understanding the messages contained within security log streams is crucial to any network's security.

The aforementioned correlation should be done in real time else it defeats the purpose of analyzing security threats and vulnerabilities and reducing the potential harm caused by them to the company. This real time swift approach, while trying not to compromise on the accuracy of risk detection, needs to be able to cater to log streams generated from majority, if not all, of the devices present in the network.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for populating a database by conducting a training phase to analyze training security log streams. A training security log stream is received by the server, such that the server extracts the words contained within the training security log. A symbol is used to substitute each of the extracted words to form a symbol string and an n-gram scan is conducted on the symbol string to generate statistical data on the symbol string. Tokens are extracted from symbol string, where the tokens are words, phrase or alphanumeric sequence represented by a symbol within training security log stream. The symbol string is replaced with the words they represent to allow for the identification of the actual token phrase within the training security log stream. A scan is conducted on the identified token phrases to acquire scan data on those phrases. Once the tokens, position information, and scan data are known they are stored within the database to allow security log streams to be analyzed in real time.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 depicts abstraction model layers according to an embodiment of the present invention.

DETAILED DESCRIPTION

Figure 1:
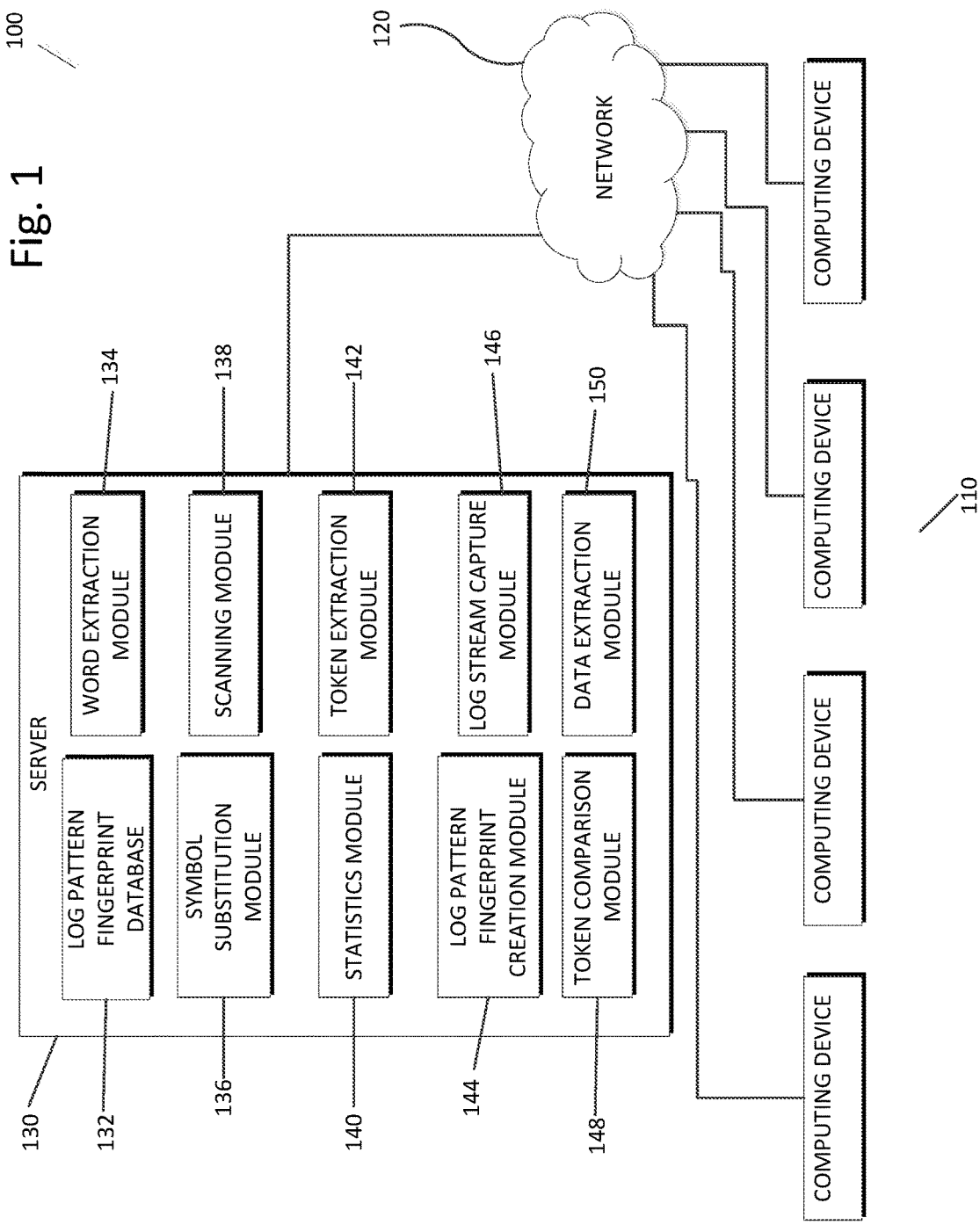
FIG. 1 is a functional block diagram illustrating a system for extracting information contain within a log stream, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

Embodiments of the invention are generally directed to extracting information contained within a security log stream. A log pattern fingerprinting database is a data store that stores tokens and corresponding positional information related to the tokens. The log pattern fingerprinting database is established by having a training phase to allow the tokens and positional information contained within the log streams to be determined and stored. Once the log pattern fingerprinting data base has been established, it allows for security log streams to be analyzed in real time. The security log streams are captured, by copying or duplicating the incoming security log streams so that they can be scanned and the tokens contained within the security log stream are extracted and compared with the information contained within the log pattern fingerprinting database.

The log pattern fingerprint database allows for a reduction of redundancies in identifying and defining new patterns for computing devices as they could be using similar logs to define common events like authentication, service status, etc. Processing the security log stream in accordance with embodiments of the present invention enables many kinds of computing device logs to be processed, regardless of device types, log formats and sources. A single pattern fingerprint can now be shared by multiple devices and hence, supporting more and more devices can get easier and faster.

FIG. 1 is a functional block diagram illustrating a system for extracting information contained within a security log stream 100, in accordance with an embodiment of the present invention. The system for extracting information contained within a security log stream 100 allows for the capture of security log streams and identification of information contained therein from computing devices that are connected to a network. The system for extracting information contain within a log stream 100 includes computing devices 110 and server 130 connected over network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between server 130 and computing devices 110.

FIG. 1 shows a plurality of computing devices 110 but the present invention is not limited to a plurality of computing devices 110. Embodiments of the invention may be practiced with a single computing device 110 connected to server 130, via network 120 to allow for server 130 to capture the log stream of the computing device 110.

Computing devices 110 may be any type of computing devices that are capable of connecting to network 120, for example, a laptop computer, tablet computer, netbook computer, personal computer (PC), a desktop computer, a smart phone, or any programmable electronic device supporting the functionality required by one or more embodiments of the invention. The computing devices 110 can be any type of computing device as long as a security log stream is generated within network 120 when the computing devices 110 are connecting to the network 120 or doing other operations that cause a security log stream to be generated. The computing devices 110 may include internal and external hardware components, as depicted and described in further detail below with respect to FIG. 4. In other embodiments, the computing devices 110 may operate in a cloud computing environment, as depicted in FIGS. 5 and 6.

Server 130 includes a log pattern fingerprint database 132 and captures the security log streams from the computing devices 110, for example, the security logs can be capture by copying, duplicating or redirecting the security logs through necessary analyzing modules, and analyzes the security log streams to extract information contained therein, which is considered relevant based on the location of the detected tokens within the security log stream. Server 130 includes the log pattern fingerprint database 132, a word extraction module 134, a symbol substitution module 136, a scanning module 138, a statistics module 140, a token extraction module 142, a log pattern fingerprint creation module 144, a log stream capture module 146, token comparison module 148, and a data extraction module 150.

To generate the necessary data to be stored in the log pattern fingerprint database 132, the server 130 conducts a training phase where training security log streams are supplied to the server to allow the data contained within each line of the training security log stream to be identified. The training security log streams are security log streams that are generated from known computing devices 110 when they connect to the network 120. The training security log streams are chosen based of the known data contained within them, which allows for the identification of the different tokens contained therein, which will be described in further detail below. The training phrase for the log pattern fingerprint database 132, will be describe in greater detail below.

The word extraction module 134 extracts words contained within the training security log stream. In one embodiment, the word extraction module 134 defines a boundary character as a character that appears between consecutive words as a non-alpha-numeric character, i.e. any characters other than a-z and 0-9. When a boundary character is detected in a line, it is determined that the end of the word's position is reached, and the detected word's position is recorded. For example, if a line in the training security log stream contains "An outbound remote access SA (SPI=0xF868D359) between 209.221.240.16 and 70.20.24.110 (user=ptb2eg b) has been deleted," the word extraction module 134 would extract the words from the training security log stream as follows: "[An][outbound][remote][access][SA][(][SPI][=] [0xF868D359][)][between][209][.][221][.][240][.][16][and] [70][.][20][.][34][.][110][(][user][=][ptb2egb][)][has][been] [deleted]." where "H" marks the separation of the extracted words by the word extraction module 134.

The symbol substitution module 136 substitutes a different single symbol for each of the extracted words. The symbol substitution module 136 repeats the same single symbol in the situation where an extracted word is repeated in the training security log stream. Therefore, the extracted words in the above example, [.], [(], [)] and [=] would each be substituted by a same single symbol at each location of the extracted word, but each of the extracted words would have different single symbol that is repeated. The symbol substitution module 136 creates a symbol string that represents each of the extracted words of the training security log stream, and each symbol is associated with the position in the data stream line at which the associated word occurred.

The scanning module 138 performs an n-gram scan, wherein n is an integer, on the symbol string created by the symbol substitution module 136. The n-gram scan can be, for example, a 4-gram scan, meaning that the scanning module 138 scans the symbol string four symbol at a time. The scanning module 138 starts with the first symbol of the symbol string and scans the symbols in groups of 4, while advancing its way to the other end of the of the symbol string one symbol at a time. The scanning module 138 always scans in the group, i.e. the integer n value, and as it adds the next symbol it the string it removes the symbol from the scanned group that falls outside then grouping based on the integer value when the new symbol is being considered part of the scan group. The scanning module 138 uses an integer value for n in the range of 2 to 9. The scanning module 138 scans the symbol string in the n-gram scan till the entire symbol string is scanned. The scanning module 138 generates statistical data which includes information such as the frequency of occurrences of a character or symbol at a position of some entity identified using n-gram scan for each log line. The scanning module 138 performs an n-gram scan on the restored training security logs to acquire n-gram scans of the identified tokens within the training security log stream, as described in further detail below.

The statistics module 140 collects the statistical data generated by the n-gram scan of the symbol string. The statistical data includes information such as the frequency of occurrences of a character or symbol at a position of some n-letter length entity identified using n-gram scan for each log line. Based on the statistical data collected for each log line, conditional probabilities to estimate which symbol would follow a particular sequence of n-grams for the given security log stream are computed for each log line. For each log line, a distribution of the occurrences of each character is collected and used to produce the frequency distribution data, such as may be used to produce a histogram. The statistics module 140 generates histogram data for each log line in the log stream.

Each log stream consists of a stream of tokens. The tokens are words, phrase or alphanumeric sequence that form part of the log that cannot be further subdivided. For example, a user name can be considered a token. Keywords, such as "Source", "Dst", common in log streams are tokens. There are variable tokens and there are constant tokens.

Variable tokens contain varying contents across log entries in the log streams, and denote same kind of information, but of different content and can vary in representation. For example, variable tokens may include date, timestamp, IP address, URL, and numbers. Constant tokens contain static values across log entries in the log steams and have the same meaning and do not change over different instances of log stream from the same device. For example, constant tokens may include "IPSEC", "outbound", "remote", "access", "between", "and", "(SPI=", "deleted", "(user=", "connection refused", "login succeeded for", etc.

The token extraction module 142 receives the histogram data for each line of the training security log stream. The token extraction module 142 conducts a forward n-gram scan which will be performed starting from the position where the symbol in the symbol string that registers the highest count in the histogram data. Each token contained in the log line is made up of one or more symbols. The token extraction module 142 stores the tokens in a hash table to determine the type of token for each token. The types of tokens are either a variable token or a constant token, as defined above.

For example, if the first log line includes "User K login," the token extraction module 142 replaces tokens with the phrase "[VAR]" one at a time, and hashes the resulting strings, as well as the original, non-modified one. Resulting content of the hash table is as follows: "User K login", "[VAR] K login", "User [VAR] login", "User K [VAR]". For example, when the token extraction module 142 receives the real time input, i.e. not the training phase, "User X login". The token extraction module 142 performs the same replacements and checks the hash table at every replacement: "[VAR] X login", did not match, so it is add to the hash table too, "User [VAR] login" matches, thus, the token extraction module 142 determines that X is actually the changing part, and also that it was K in a previous message. Hence, the token extraction module 142 detects the variable token positions and their values.

The log pattern fingerprint creation module 144 replaces the single symbol with the extracted words they represent and the words, phrases, number or such are identified based on the positional information that correspond to the tokens found in the symbol string derived by the token extraction module 142. The scanning module 138 conducts an n-gram scan on the restored training logs to acquire n-gram scan data of the identified tokens of the restored training security logs. The log pattern fingerprint creation module 144 outputs the restored logs containing the tokens, the positional information that is needed to extract data from log streams, and the n-gram scan data for the identified tokens.

A user determines how the extracted tokens are and to which field (hostname, source IP address, etc.) a particular token should be mapped and the n-gram scan data associated with each of the tokens. The log pattern fingerprint creation module 144 creates the necessary mapping and stores them in the log pattern fingerprint database 132. These mappings are stored in the log pattern fingerprint database 132.

When the server 130 is not in a training phase, the log stream capture module 146 captures incoming security log streams, which are generated by the computing devices 110, for analysis. The log stream capture module 146 captures these security log streams in real time. The scanning module 138 performs an n-gram scan on each line of the captured security log stream similar to the scan preformed in the training phase. The scanning module 138 scans the first character of the captured security log stream and scans the characters in groups of the integer value of n, while advancing its way to the other end of the of the captured security log stream. The scanning module 138 advances the scan of the characters at a scan value less than or equal to the integer n value. The difference is that the word extraction module 134 and the symbol substitution module 136 do not perform their functions prior to the scanning module 138 performing the n-gram scan, i.e. the single character symbols are not applied to the captured security log line. The scanning module 138 performs an n-gram scan, i.e. scanning a n-group of characters at a time, until the end of the security log line is reached.

The token extraction module 142 receives the scan data for the capture security log line from the scanning module 138. The token extraction module 142 compares the n-gram scan data of the capture security log with the n-gram scan data stored in the log pattern fingerprint database 132 to identify the tokens within capture security log. The token extraction module 142 identifies the tokens and the positional information contained within the captured security log line.

The token comparison module 148 receives the extracted tokens and positional information from the token extraction module 142 and compares them with the stored tokens and positional information contained within the log pattern fingerprint database 132. The data extraction module 150 extracts the data from the security log stream that is located between the identified tokens based on the positional information of the identified tokens for later analysis.

Figure 2:
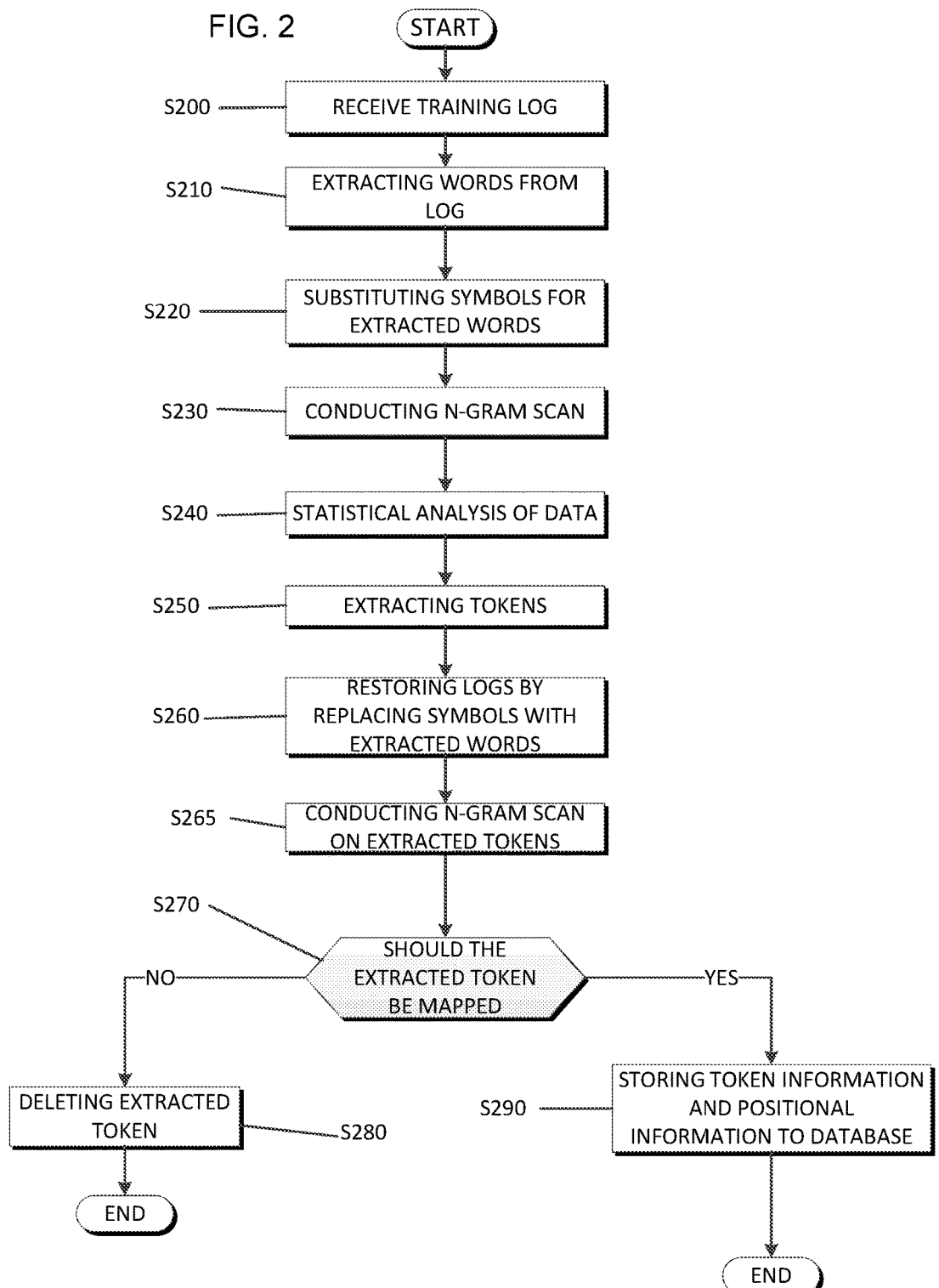
FIG. 2 is a flowchart depicting operational steps of the training phase for the log pattern fingerprint database of FIG. 1, in accordance with an embodiment of the present invention.
Figure 3:
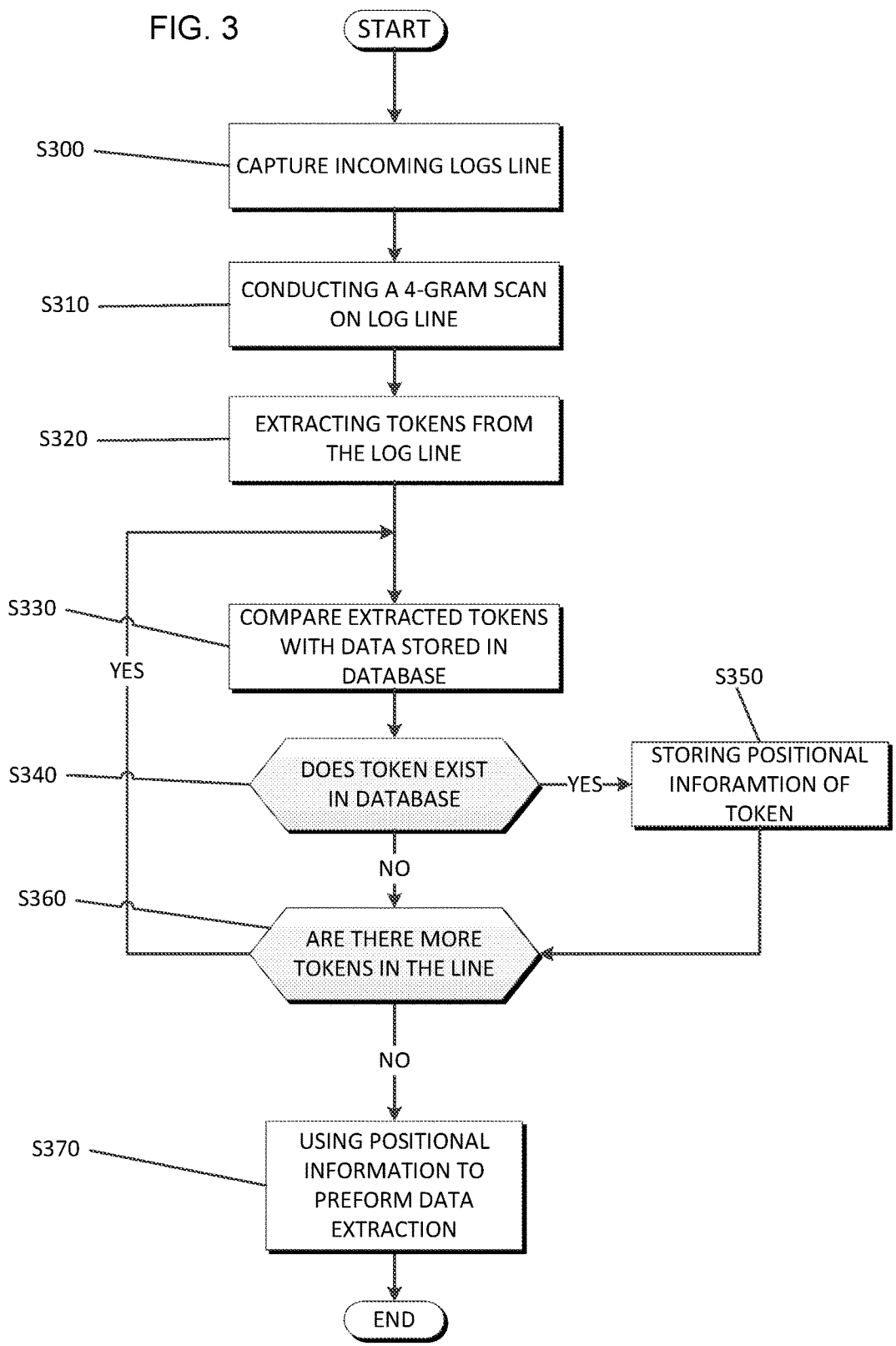
FIG. 3 is a flowchart depicting operational steps of real time analysis of log streams, in accordance with an embodiment of the present invention.

FIG. 2 is a flowchart depicting operational steps of the training phase for the log pattern fingerprint database of FIG. 1, in accordance with an embodiment of the present invention.

The word extraction module 134 on server 130 receives the training security log stream (S200) and extracts the words from the training security log stream (S210). The symbol substitution module 136 substitutes a different single character symbol for each of the extracted words to create a symbol string for each line of the training security log stream (S220). The scanning module 138 performs a n-gram scan (wherein n is a integer) of the symbol string for each line of the training security log stream (S230). The statistics module 140 performs a statistics analysis of the scanned data (S240) and the token extraction module 142 extracts tokens from a histogram chart generated by the statistics module 140 and determines the positional information for the extracted tokens (S250). The log pattern fingerprint creation module 144 replaces the single character symbols with the extracted words they represent (S260). The scanning module 138 preforms an n-gram scan on the restored training security logs to acquire n-gram scan data on the restored extracted tokens (S265). The log pattern fingerprint creation module 144 determines if the extraction tokens and the positional information should be stored or disregarded (S270). The log pattern fingerprint creation module 144 disregards the extracted token and positional information when it is determined that the extracted token is not relevant (S280). The log pattern fingerprint creation module 144 stores the relevant extracted tokens, positional information and the n-gram scan data associated with the extracted tokens into the log pattern fingerprint database 132 (S290).

Figure 4:
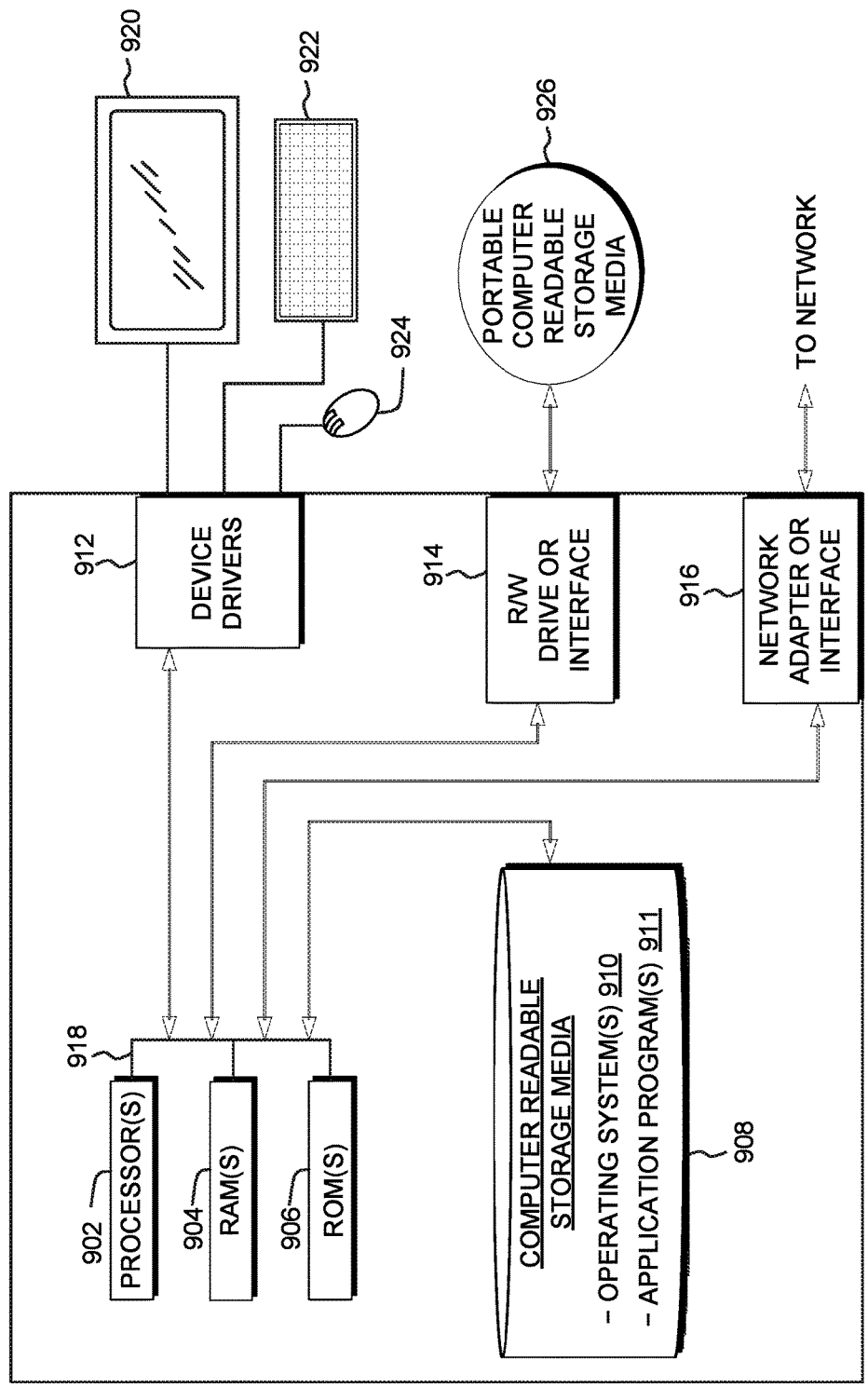
FIG. 4 is a block diagram of components of a system for extracting information contain within a log stream of FIG. 1, in accordance with embodiments of the present invention.
Figure 5:
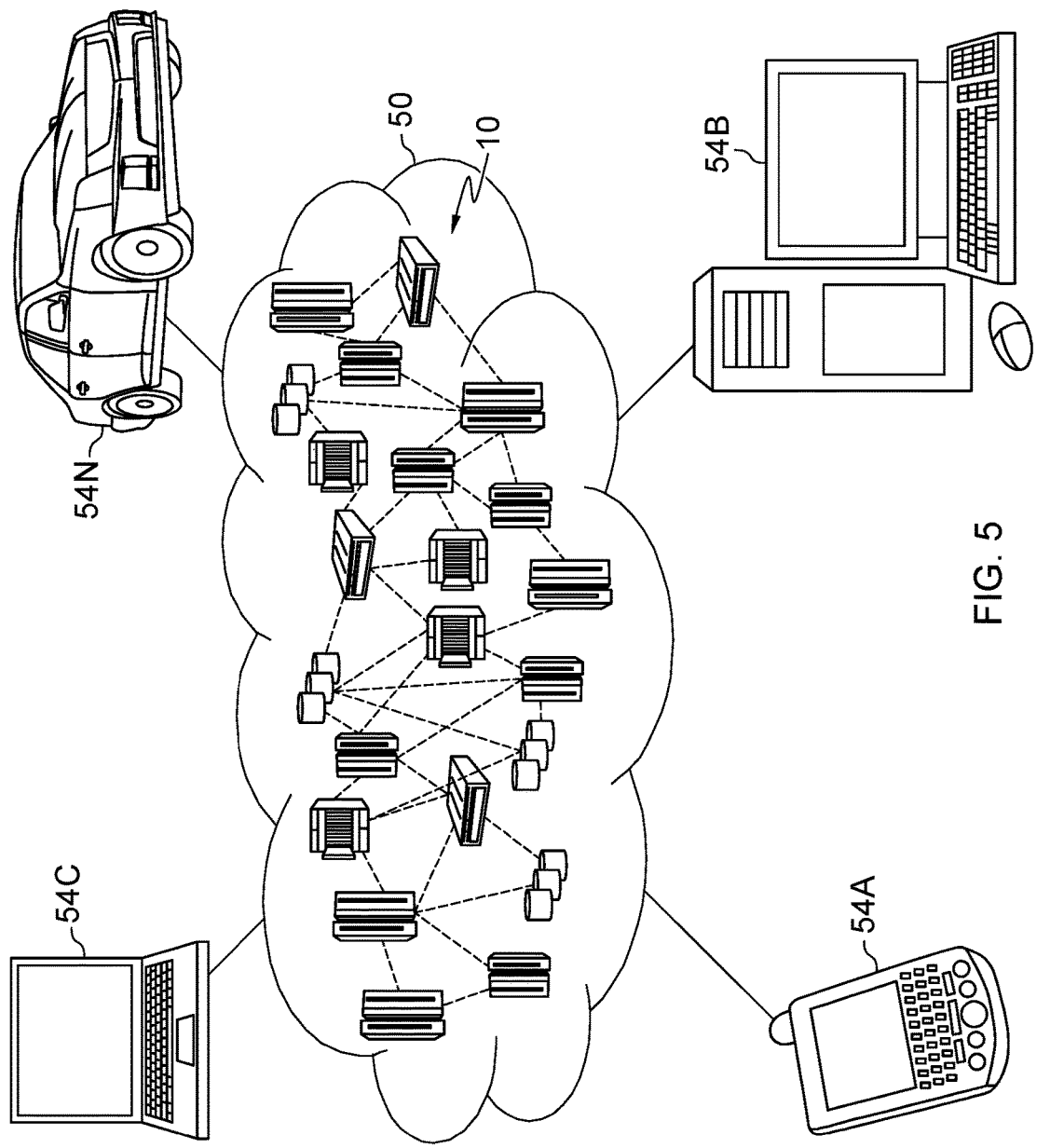
FIG. 5 depicts a cloud computing environment according to an embodiment of the present invention.

FIG. 4 is a block diagram of components of a system for extracting information contain within a log stream of FIG. 1, in accordance with embodiments of the present invention.

The log stream capture module 146 captures a security log stream from the computing devices 110 in real time (S300). The scanning module 138 performs a n-gram scan (where n is an integer) on each line of the capture security log stream (S310). The token extraction module 142 extracts the tokens from each line of the n-gram scanned security log stream by comparing the n-gram scanned data of the captured log stream with the n-gram data stored within the log pattern fingerprint database 132 (S320). The token comparison module 148 compares the extracted tokens with those stored in the log pattern fingerprint database 132 (S330) and determines if the token exists in the log pattern fingerprint database 132 (S340). The token comparison module 148 stores the positional information of the token if the token exists in the log pattern fingerprint database 132 (S350). The token comparison module determines if there are any more extracted tokens in the log stream line that need to be compared (S360). When the comparison is done, the data extraction module 150 extracts the data from within the line of the security log stream using the token and positional information to perform the data extraction (S370).

FIG. 4 depicts a block diagram of components of computing devices 110 and server 130 of system for extracting information contain within a log stream 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing devices 110 and/or server 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the system for extracting information contain within a log stream 100 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices 110 and/or server 130 may also include a R/W drive or interface 914 to read from and write to one or more portable computer readable storage media 926. Application programs 911 on computing devices 110 and/or server 130 may be stored on one or more of the portable computer readable storage media 926, read via the respective R/W drive or interface 914 and loaded into the respective computer readable storage media 908.

Computing devices 110 and/or server 130 may also include a network adapter or interface 916, such as a TCP/IP adapter card or wireless communication adapter (such as a 4G wireless communication adapter using OFDMA technology). Application programs 911 on computing devices 110 and/or server 130 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing devices 110 and/or server 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the system for extracting information contain within a log stream 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method comprising:
receiving, by a computer, a training security log stream;
extracting, by the computer, words contained within each line of the training security log stream;
substituting, by the computer, a symbol for each of the extracted words to create a symbol string;
scanning, by the computer, the symbol string to collect statistical data based on the symbol sequencing within the symbol string;
generating, by the computer, frequency distribution data based on the statistical data collecting during the scanning;
extracting, by the computer, tokens and the positional information corresponding to the tokens identified in the frequency distribution data, wherein the tokens are words, phrase or alphanumeric sequence represented by a symbol within training security log stream, determining, by the computer, if the identified token is either a variable token or a constant token by using the frequency distribution data, disregarding, by the computer, the variable tokens and their corresponding positional information, and storing, by the computer, the constant tokens and the corresponding positional information;
replacing, by the computer, the substituted symbols with the extracted words they represent;
identifying, by the computer, the tokens in the training security log stream based on the extracted positional information;
scanning, by the computer, the identified tokens of the restored training security log stream to acquire scan data of the identified tokens; and
storing, by the computer, in the database the identified tokens, positional information and the scan data for the identified tokens found in the training security log stream.

2. The method of claim 1, wherein the scanning, by the computer, the symbol string to collect statistical data based on the symbol sequencing within the symbol string, further comprises:
wherein the scan is an n-gram scan that scans the each line starting at one end and advancing it way to the other end of the symbol string one symbol at a time; and
wherein n is an integer that represents the number of symbols that are being scan at one time.

3. The method of claim 1, wherein the extracting, by the computer, words contained within each line of the training security log stream, further comprises:
identifying, by the computer, a boundary character between consecutive words in each line of the training security log stream;
wherein the boundary character is a non-alpha-numeric character.

4. The method of claim 1, further comprising:
receiving, by a computer, a security log stream generated by a computing device;
scanning, by the computer, each record of the security log stream;
comparing, by the computer, the scan of each record with the stored scan data contained within the database to identify tokens and the positional information corresponding to the identified token; and
in response to the identified tokens matching the tokens contained within the database, extracting, by the computer, data contained within the security log stream based on the identified tokens and the positional information corresponding to the identified tokens.

5. The method of claim 4, wherein scanning, by the computer, each record of the security log stream comprises:
wherein the scan is an n-gram scan that scans the each line starting at one end and advancing it way to the other end of the symbol string one symbol at a time; and
wherein n is an integer that represents the number of characters that are being scan at one time.

6. The method of claim 5, wherein the integer n is an integer chosen in the range of 2 to 9.

7. A computer program product comprising:
one or more non-transitory computer-readable storage media and program instructions stored on the one or more non-transitory computer-readable storage media, the program instructions comprising:
program instructions to receive a training security log stream;
program instructions to extract words contained within each line of the training security log stream;
program instructions to substitute a symbol for each of the extracted words to create a symbol string;
program instructions to scan the symbol string to collect statistical data based on the symbol sequencing within the symbol string;
program instructions to generate frequency distribution data based on the statistical data collecting during the scanning;
program instructions to extract tokens and the positional information corresponding to the tokens identified in the frequency distribution data, wherein the tokens are words, phrase or alphanumeric sequence represented by a symbol within training security log stream, determining if the identified token is either a variable token or a constant token by using the frequency distribution data, disregarding the variable tokens and their corresponding positional information, and storing the constant tokens and the corresponding positional information;
program instructions to replace the substituted symbols with the extracted words they represent;
program instructions to identify the tokens in the training security log stream based on the extracted positional information;
program instructions to scan the identified tokens of the restored training security log stream to acquire scan data of the identified tokens; and
program instructions to store in the database the identified tokens, positional information and the scan data for the identified tokens found in the training security log stream.

8. The computer program of claim 7, wherein the scanning the symbol string to collect statistical data based on the symbol sequencing within the symbol string, further comprises:
wherein the scan is an n-gram scan that scans the each line starting at one end and advancing it way to the other end of the symbol string one symbol at a time; and wherein n is an integer that represents the number of symbols that are being scan at one time.

9. The computer program of claim 7, wherein the extracting words contained within each line of the training security log stream, further comprises:
identifying a boundary character between consecutive words in each line of the training security log stream;
wherein the boundary character is a non-alpha-numeric character.

10. The computer program of claim 7, wherein the program instruction further comprises:
receiving a security log stream generated by a computing device connected to a network;
scanning each record of the security log stream;
comparing the scan of each record with the stored scan data contained within the database to identify tokens and the positional information corresponding to the identified token; and
in response to the identified tokens matching the tokens contained within the database, extracting data contained within the security log stream based on the identified tokens and the positional information corresponding to the identified tokens.

11. The computer program of claim 10, wherein scanning each record of the security log stream comprises:
wherein the scan is an n-gram scan that scans the each line starting at one end and advancing it way to the other end of the symbol string one symbol at a time; and
wherein n is an integer that represents the number of characters that are being scan at one time.

12. The computer program of claim 11, wherein the integer n is an integer chosen in the range of 2 to 9.

13. A computer system comprising:
one or more computer processors, one or more computer-readable storage device, and program instructions stored on one or more of the computer-readable storage device for execution by at least one of the one or more processors, the program instructions comprising:
program instructions to receive a training security log stream;
program instructions to extract words contained within each line of the training security log stream;
program instructions to substitute a symbol for each of the extracted words to create a symbol string;
program instructions to scan the symbol string to collect statistical data based on the symbol sequencing within the symbol string;
program instructions to generate frequency distribution data based on the statistical data collecting during the scanning;
program instructions to extract tokens and the positional information corresponding to the tokens identified in the frequency distribution data, wherein the tokens are words, phrase or alphanumeric sequence represented by a symbol within training security log stream, determining if the identified token is either a variable token or a constant token by using the frequency distribution data, disregarding the variable tokens and their corresponding positional information, and storing the constant tokens and the corresponding positional information;
program instructions to replace the substituted symbols with the extracted words they represent;
program instructions to identify the tokens in the training security log stream based on the extracted positional information;
program instructions to scan the identified tokens of the restored training security log stream to acquire scan data of the identified tokens; and
program instructions to store in the database the identified tokens, positional information and the scan data for the identified tokens found in the training security log stream.

14. The computer system of claim 13, wherein the scanning the symbol string to collect statistical data based on the symbol sequencing within the symbol string, further comprises:
wherein the scan is an n-gram scan that scans the each line starting at one end and advancing it way to the other end of the symbol string one symbol at a time; and
wherein n is an integer that represents the number of symbols that are being scan at one time.

15. The computer system of claim 13, wherein extracting words contained within each line of the training security log stream, further comprises:
identifying a boundary character between consecutive words in each line of the training security log stream;
wherein the boundary character is a non-alpha-numeric character.

16. The computer system of claim 13, wherein the program instruction further comprises:
receiving a security log stream generated by a computing device connected to a network;
scanning each record of the security log stream;
comparing the scan of each record with the stored scan data contained within the database to identify tokens and the positional information corresponding to the identified token; and
in response to the identified tokens matching the tokens contained within the database, extracting data contained within the security log stream based on the identified tokens and the positional information corresponding to the identified tokens.

17. The computer system of claim 16, wherein scanning each record of the security log stream comprises:
wherein the scan is an n-gram scan that scans the each line starting at one end and advancing it way to the other end of the symbol string one symbol at a time; and
wherein n is an integer that represents the number of characters that are being scan at one time.

18. The computer system of claim 17, wherein the integer n is an integer chosen in the range of 2 to 9.

* * * * *